US005432515A

United States Patent [19]

O'Conner

[11] Patent Number: 5,432,515
[45] Date of Patent: Jul. 11, 1995

[54] MARINE INFORMATION SYSTEM

[76] Inventor: Joe S. O'Conner, Box 43, Woodland Mills, Tenn. 38271

[21] Appl. No.: 102,799

[22] Filed: Aug. 6, 1993

Related U.S. Application Data

[63] Continuation-in-part of Ser. No. 866,210, Apr. 9, 1992, Pat. No. 5,274,378.

[51] Int. Cl.⁶ ............................................. G01S 13/00
[52] U.S. Cl. .................................... 342/23; 340/984
[58] Field of Search ............... 364/443, 449, 456, 460; 342/23, 450, 457; 340/984, 985

[56] References Cited

U.S. PATENT DOCUMENTS

| | | | |
|---|---|---|---|
| 3,594,716 | 7/1971 | Waterman . | |
| 3,707,717 | 12/1972 | Frielinghaus . | |
| 3,754,247 | 8/1973 | Hansford | 342/23 |
| 3,759,094 | 9/1973 | Al | 340/29 |
| 3,772,693 | 11/1973 | Allard et al. . | |
| 3,956,742 | 5/1976 | Karl | 340/224 |
| 4,063,240 | 12/1977 | Isbister et al. . | |
| 4,117,482 | 9/1978 | Jepsky et al. | 342/23 |
| 4,340,936 | 7/1982 | Mounce | 364/443 |
| 4,428,057 | 1/1984 | Setliff et al. | 364/521 |
| 4,529,981 | 7/1985 | Ratcliffe | 340/485 |
| 4,894,662 | 1/1990 | Counselmann | 342/357 |
| 5,210,534 | 5/1993 | Janex | 340/984 |

OTHER PUBLICATIONS

Kirksaether, "Berthing Aid System GX-100", full 6-panel brochure, 1994, Trondheim, Norway.
Kirksaether, "Automatic Lexvel Gauging System GL-90", full 6-panel brochure, 1993, Trondheim, Norway.

*Primary Examiner*—Mark Hellner
*Attorney, Agent, or Firm*—James Creighton Wray

[57] ABSTRACT

A docking information system for assistance in the docking of vessels uses sensors providing information indicative of the relationship between a ship and a reference, such as a dock, a coast line, a river bank, docks, bends and docking areas. A computer coordinates the information. A wireless transmitter associated with the computer transmits signals indicative of the information. A portable receiver and indicator carried by the captain of the vessel has a receiver for receiving the transmitted signals and an indicator screen to display the information. The remote receivers also include fixed monitors on the ship and on shore, and telephones on the ship which communicate with the computer and into the telephone link with shore-based communications.

7 Claims, 4 Drawing Sheets

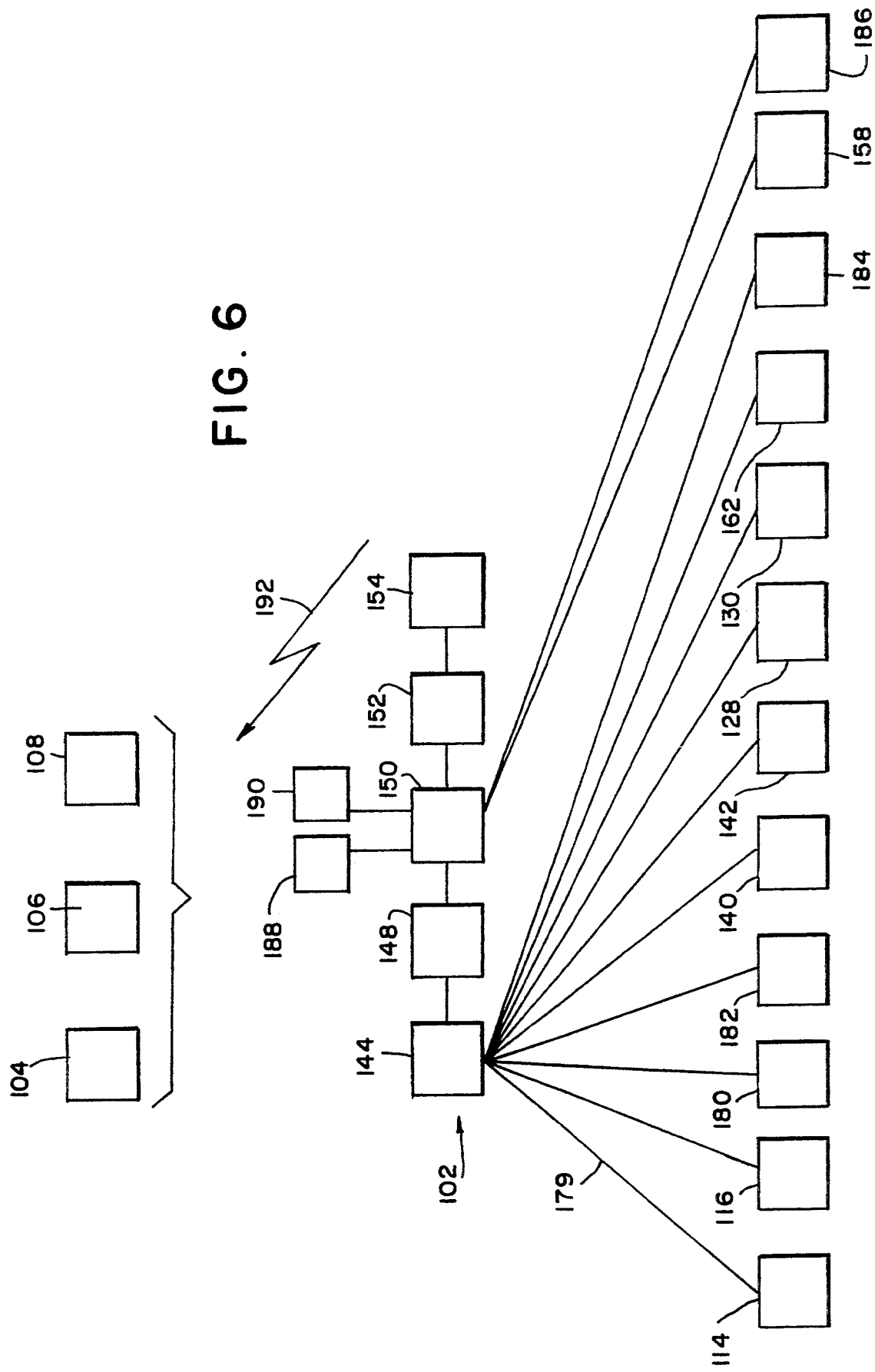

MARINE INFORMATION SYSTEM

This is a continuation-in-part of U.S. application Ser. No. 07/866,210 filed Apr. 9, 1992, now U.S. Pat. No. 5,279,378.

BACKGROUND OF THE INVENTION

The invention relates to an indicator system for assistance in the docking of vessels.

The docking of vessels requires considerable skill and experience on the part of the captain or pilot. The vessel has to approach the dock extremely slowly. Otherwise, due to the huge mass of ships, damage both of the ship and of the dock might be caused. This is particular true for large ships such as oil tankers. Usually, the captain or pilot is not able to see the gap between ship and dock. In the case of fog, he may not even be able to see the ends of his ship.

It is an object of the invention to provide a system which facilitates the docking of a vessel.

SUMMARY OF THE INVENTION

According to the invention, this objective is achieved by providing signals indicative of the movement between a ship and a reference. A computer gathers information. A receiver associated with the computer receives information signals from plural sensors. A transmitter transmits signals indicative of the information, and receivers and indicators aboard ship receive the transmitted signals and display information for a pilot and captain.

A docking information system for assistance in the docking of vessels uses sensors providing information indicative of the relationship between a ship and a reference, such as a dock. A computer coordinates the information. A wireless transmitter associated with the computer transmits signals indicative of the information. A portable receiver and indicator carried by the captain of the vessel has a receiver for receiving the transmitted signals and an indicator screen to display the information. The remote receivers also include fixed monitors on the ship and on shore, and telephones on the ship which communicate with the computer and into the telephone link with shore-based communications.

The system may be used not only for docking, but also for traffic, especially river and coastal traffic. It is anticipated that systems be placed at strategic positions along rivers and coast lines where various sensor outputs and other pertinent information are fed into the computer then relayed via the video/data link to tugs and boats.

In addition to the normal velocity, ranging, current, tide and wind information, information such as docking times, telephone messages, fax, dredging operations, channel depth and location, local traffic, et cetera may be fed into the computer controlled video/data link and relayed to the tug or boat.

As visioned, numerous systems will be placed at strategic positions, such as docks, river bends, bridges, narrow channels, confluences, ferry crossings and so on. It is possible that thousands will be needed, one system at every port and at positions every one to two miles along navigable rivers and coastal areas to satisfy needs. Tugs, boats and ships with video/data receivers will be able to use the local information as needed. The video/data transmitters will normally be for local information only, but tie-in to a network, or set-up as a network is also foreseen. Certainly, fax and telephone messages are tied into standard telephone lines. The system may be one way or two way. That is, in the more simple form, the video/data receivers will receive only from the shore based system. As an option, the link may be two way.

The gist of the system is that it will sense local traffic, determine its position and speed, and relay this along with other pertinent data to the tug or boat. The tug or boat need only have a normal monitor to receive the information. Because monitors are not always viewable in sunlight, as an option, the tug or boat may acquire the handheld LCD data receiver at a nominal cost, about the same price as a small color monitor. This allows viewing in direct sunlight and at night.

The system will be used for coordinating river traffic for estimating and planning times of arrivals at locks and single passage channels to reduce fuel consumption and to improve traffic flow.

These and further and other objects and features of the invention are apparent in the disclosure, which includes the above and ongoing written specification, with the claims and the drawings.

BRIEF DESCRIPTION OF THE DRAWINGS

FIG. 6 is a schematic chart of the information system of the present invention.

DETAILED DESCRIPTION OF THE DRAWINGS

Figure 1:
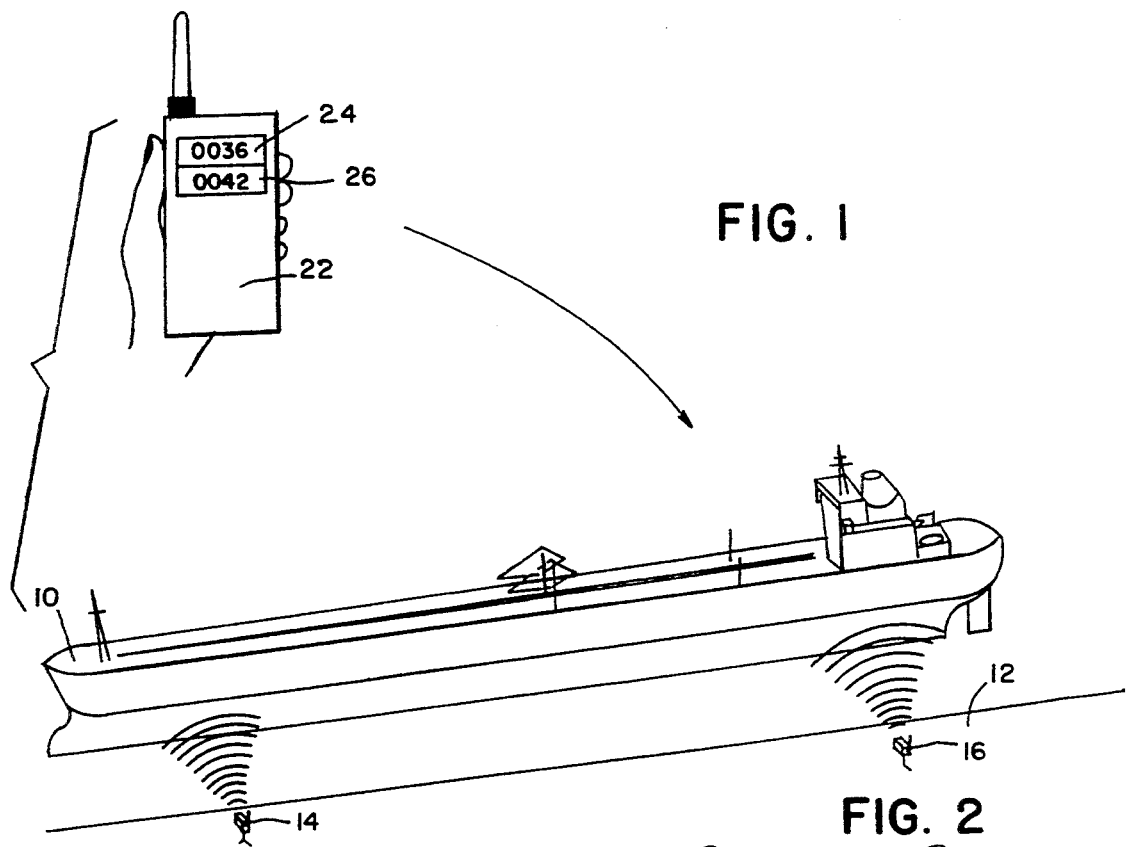
FIG. 1 is a schematic illustration and shows a ship approaching a dock, the velocity of the ship relative to the dock being monitored by radar devices, and the relative velocity being indicated by a receiver and indicator unit.

In FIG. 1, numeral 10 designates a large ship such as an oil tanker. The ship 10 is approaching a dock 12. Located on the dock are two stationary Doppler radar devices 14 and 16. The radar devices 14 and 16 are spaced by a distance which is slightly less than the length of the ship 10. Thus one of the radar devices 14 measures the approaching velocity of the head of the ship 10, while the other radar device 16 measures the approaching velocity of the stern of the ship 10. If these velocities were different, this would be an indication of a turning motion of the ship 10.

Figure 2:
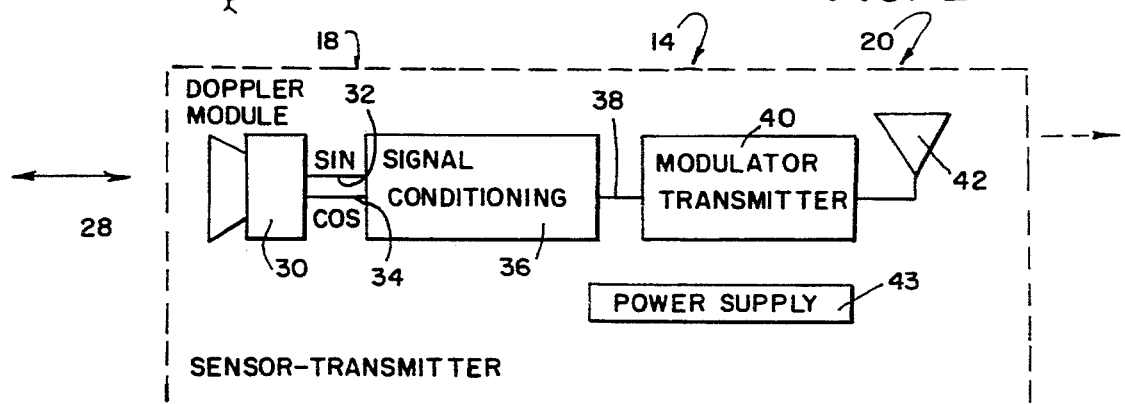
FIG. 2 is a block diagram and shows the radar device and associated transmitter.
Figure 3:
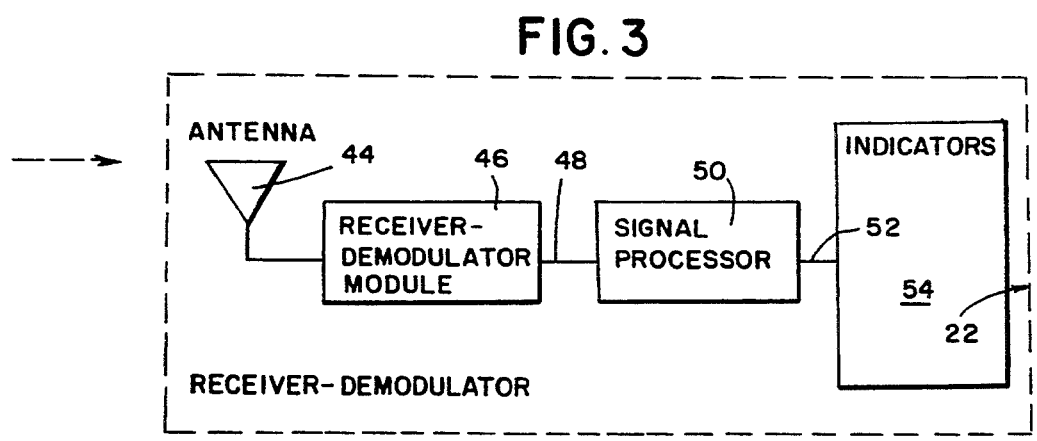
FIG. 3 is a block diagram and shows the receiver and indicator unit.

As can be seen from FIG. 2, the radar device 14 comprises a Doppler module assembly 18 and a transmitter 20. The Doppler module assembly 18 provides a relative velocity signal indicative of the relative velocity between ship 10 and radar device 14. This signal is transmitted by the transmitter to a remote receiver and indicator unit 222, which indicates the relative velocity on a display 24. In similar manner, the radar device 16 contains a Doppler module and a wireless transmitter, which transmits the relative velocity signal received from the Doppler module assembly 18 to the receiver and indicator unit 22. This second relative velocity is indicated by a second display 26. The receiver and indicator unit 22 is a portable device, as shown in FIG. 1. This receiver and indicator unit 22 can be held by the captain or pilot during the docking procedure. Unit 22 enables the captain to continuously watch the approaching velocity of the ship towards the dock.

Referring to FIG. 2, numeral 28 in the Doppler module assembly 18 designates a microwave antenna. The microwave antenna 28 is a 240 mm long linearly polarized horn microwave antenna with an 80 mm×80 mm aperture. The gain is 25 db at 24 GHz. The microwave antenna 28 is connected to a Doppler module 30. The Doppler module 30 is a GOS 2765 Doppler module manufactured by Alpha Industries, Woburn, Mass. The Doppler module 30 provides sine and cosine signals at outputs 32 and 34, respectively. The sine and cosine signals are applied to a signal conditioning circuit 36. The signal conditioning circuit 36 is based on a commercially available signal processing module manufactured by RECORD, Fehrdtorf, Switzerland. The signal processing module, which is designed to process the radar signals of radar door openers, contains two amplifier channels for the sine and cosine Doppler frequency signals.

The RECORD signal processing module has been modified by exchanging some of the capacitors at the inputs and in the feedback loops of the amplifiers in the two amplifier channels so as to extend the frequency range of the module towards low frequencies.

The Doppler device is to detect closing motion of the ship, that is to say, motion of the ship towards the dock. The Doppler frequency is indicative of the absolute amount of the velocity only. A "closing" signal indicating whether the object is closing or receding can, however, be derived from the phases of the sine and cosine signals. With low closing velocities, such as those to be measured in the present case, such "closing" signal may become unstable.

Figure 4:
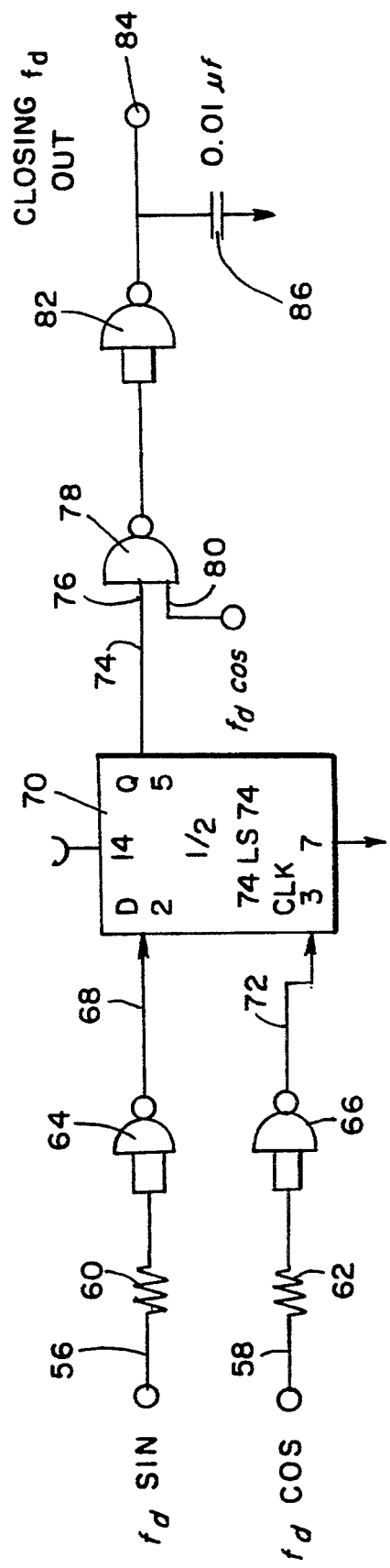
FIG. 4 is a diagram of a logic provided in the signal conditioning circuit.

For this reason, the logic of FIG. 4 is provided in the signal conditioning circuit. This logic ensures that, once a "closing" signal has been generated, such "closing" signal will continue to appear, until the sine and cosine Doppler frequency signals positively indicate "receding".

The logic of FIG. 4 receives the amplified sine and cosine Doppler frequency signals at inputs 56 and 58, respectively. These signals are applied, through 10 k—resistors 60 and 62, respectively, to inverters 64 and 66, respectively. The inverted signal from inverter 64 is applied to a "D" input 68 of a bistable device 70, i.e. a flipflop. The output from inverter 66 is applied to a clock input 72 of the bistable device 70. The bistable device 70 has an output 74. The output 74 will be high (H) if the signal at input 68 precedes the "clock" signal at input 72. In this case, the ship is closing, i.e. moving towards the dock. The output will become low (L) if the "clock" signal at input 72 precedes the signal at input 68. This will indicate that the ship is receding from the dock.

It will be apparent that, once the phase of the two sine and cosine signals has set the output of the bistable device 70 to H, the bistable device will remain in this state, even if the input signals disappear intermittently. The bistable device will change state only, after the phase of the sine and cosine signals have positively indicated a receding motion.

The output of the bistable device is applied to a first input 76 of a NAND-gate 78. The cosine Doppler frequency signal is applied to a second input 80 of the NAND-gate 78. The output from the NAND-gate is inverted by an inverter 82. The output from the inverter 82 is applied to a signal output 84. The signal output 84 is connected to ground through a 0.01 μF capacitor 86.

This logic ensures a continuous "closing" signal, and a correspondingly continuous signal processing and display, even with low closing velocities of the ship.

The signal conditioning circuit provides, at an output 38, a relative velocity signal. This relative velocity signal is indicative of the velocity of the ship relative to the stationary radar device 14 or 16. This relative velocity signal is supplied to a modulator-transmitter 40. The modulator-transmitter consists of a PCM modulator and a HF amplifier. The modulator consists of a SAW resonance module and adaptive circuitry. At least two modulators are used for each docking system to transmit the different velocity data. One modulator operates at 418 MHz. The other modulator operates at 433.9 MHz. The SAW modules are manufactured by RFM, Dallas, Tex. They are the Model MX 1019 for 418 MHz and Model MX 1005 for 433 MHz. The amplifier is a Mitsubishi M 57721 M module designed for portable radio transmitters in the 400 MHz to 450 MHz range.

The modulator-transmitter 40 is connected to a HF antenna 42. The HF antenna is a 100 mm long 400 MHz—450 MHz whip with a BNC connector on one end. The connector permits quick mounting to either the modulator-transmitter 40 or to the remote receiver and indicator unit 22. The antenna is commercially available from Conrad Electronics, Munich, Germany. Numeral 43 designates the power supply for the radar device 14.

The receiver and indicator unit 22 has an HF antenna 44. This antenna is of the same type as the antenna 42 of the radar device 14. The antenna 42 is connected to a receiver and demodulator module 46. The receiver module consists of two receiver cards, one for each frequency. The receiver cards are manufactured by Connaught, Galway, Ireland. There are two types which may be used: the delay line super regenerative type, Models RX 433/1 for 433 MHz and Model RX 418/1 for 418 MHz; or the Models RX 433/2 and RX 418/2, which have 10 db less sensitivity than the/1 models. The receiver and demodulator provides, at an output 48, signals indicative of the signals transmitted by modulator-transmitter 40 and HF antenna, and thus indicative of the relative velocity signals.

These signals are applied to a signal processor 50. The signal processor level shifts the receiver outputs and scales the Doppler frequency information from the two receiver cards to a velocity frequency suitable for displaying. The scaling, currently, is from Doppler frequency to knots. Other units such as kilometers per hour or meters per second can also be used.

The relative velocity signals thus obtained from the signal processor 50 at output 52 are indicated by indicators 54 with the displays 24 and 26 (FIG. 1). The indicators 54 are two identical counter modules. The displays are LCD displays. Such indicators are commercially available from RS Electronics, 6082 Mörfelden-Walldorf, Germany. They are listed under RS Order Number 341-569.

The specifications achieved with such a system are as follows:

The radar range of radar device is 500 m for a 1000 $m^2$ target. The velocity range is from 0.02 to 7 meters per second. The emissions are 5 milliwatts at 24.125 GHz and less than 7 watts at 418 and 433 MHz. The telemetry range, i.e. the range within which the receiver and indicator unit can receive and correctly display the signals from the radar device or devices, is at least 500 meters. The telemetry covers 360°. The radar beamwidth is 8 degrees with the microwave antenna 28 as described.

The remote receiver-demodulator 46 has a sensitivity of −95 dbm for the receiver cards RX 433/1 and RX 418/1, and of −85 dbm for the receiver cards RX 433/2 and RX 418/2. The sensitivity is valid for 360°.

The display is a four-digit LCD in hundredths of a knot.

The described system may be modified in various ways. For example, more than two radar devices, like 14 and 16, can be used along the dock. In this case, only the radar devices which sense the ship movement would provide indications. Thus those not indicating would show that the ship is not in their field of view. Thus the radar devices provide position indication in addition to velocity indication. Instead of mounting the radar devices on the dock, the radar devices may be mounted on the ship pointing to the dock.

Figure 5:
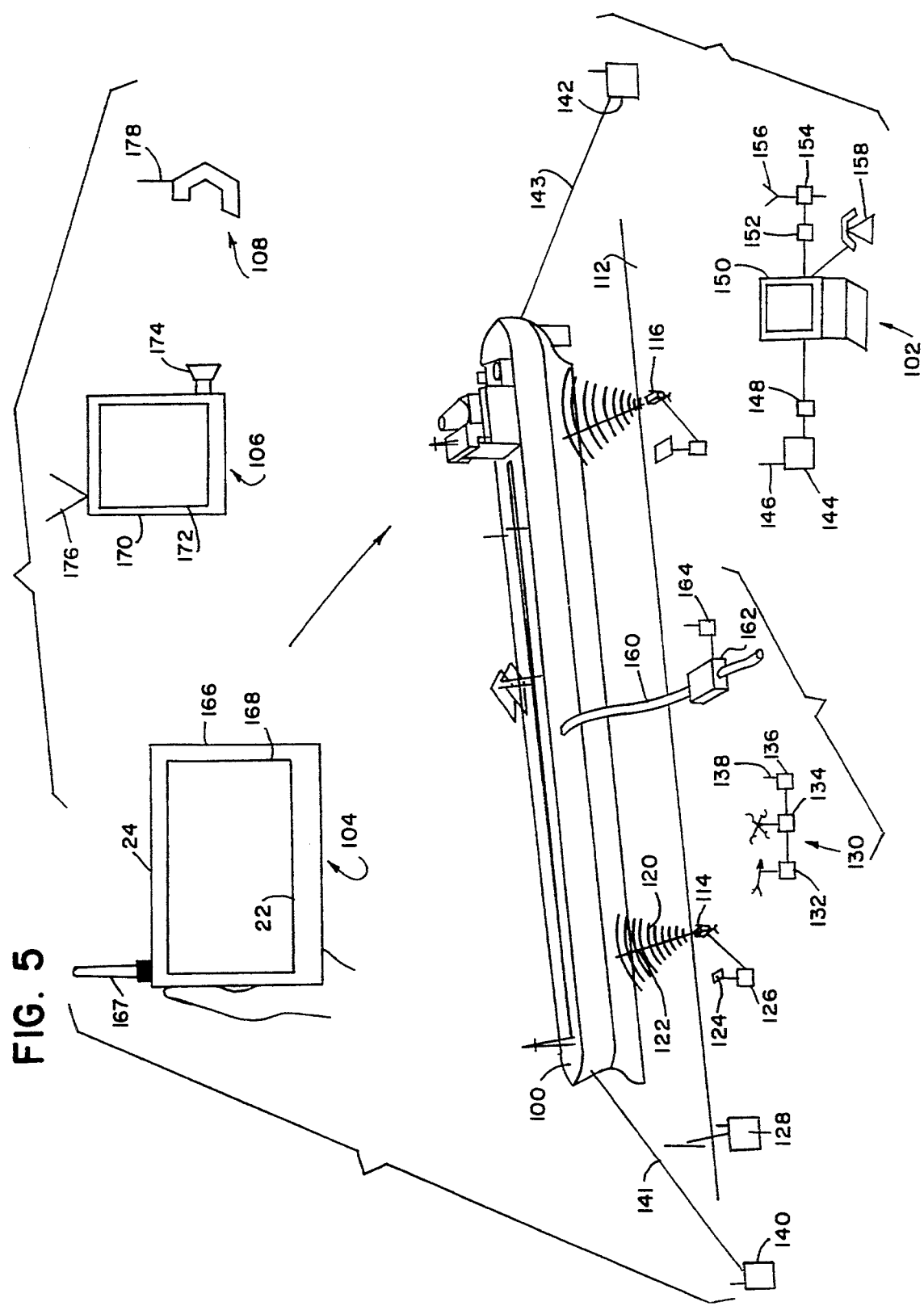
FIG. 5 is a schematic representation of the information-gathering transmitting and display system of the present invention.

Referring to FIG. 5, a ship is generally indicated by the numeral 100. A land-based information gathering and transmitting system 102 transmits information to a hand-held datalink receiver 104, a monitor set 106 and a telephone 108. The land-based system 102 is positioned in an enclosure on the dock 112.

Combination radar units and laser ranging units 114 and 116 are positioned on the dock for directing radar beams 120 and laser rays 122 toward the hull of the ship 100. The devices 114 and 116 may be any devices which provide measurements of range and/or velocity.

Solar panels 124 provide power to the battery and regulator power unit 126, which power the units 114 and 116.

A current velocity and direction sensor 128 gathers information on current velocity and direction in the body of water near the dock 112.

A wind direction and velocity sensing system 130 has a wind direction sensor 132, a wind velocity sensor 134, and a transmitter 136, with an antenna 138. The transmitter 136 and antenna 138 may be replaced by wires, cables, optical fibers or any other system which replaces the radio frequency transmission system which is described.

Mooring line tension sensors 140 and 142 sense the tension of mooring lines 141 and 143 and communicate the tension indications to a receiver 144 via an antenna 146 or the wire cable or optical fiber lines. The data receiver 144 transmits the data to a signal conditioning unit 148, which adapts the signals for transmission to the computer 150. The computer 150 uses software to assemble the data and record the data, and transmits the data to converter 152, which converts the computer data to monitor signal norms. Converter 152 communicates the signals to the modulator transmitter 154, which broadcasts the signals from antenna 156. A telephone modem 158 is connected directly to the processor 150 so that information may be received and sent via telephone lines, for example information to remote terminals and remote locations, and incoming information which is intended for transmission to the ship and for transmitting recorded information, either during docking operations or after docking operations, or during cargo unloading. Video signals and audio signals with a data subcarrier are broadcast from antenna 156 to receivers aboard the ship and to receivers on the ground.

One of the signals received by the receiver 144 is a signal from transmitter 164, which is connected to a cargo flow meter 162, which measures flow of cargo through conduit 160.

Each of the data-gathering devices has an antenna, which are generally indicated by the numeral 138.

The signals from the information-gathering system 102 are transmitted to shipboard receivers, as well as to the ground receivers. Preferred shipboard receivers are a hand-held receiver 104, which includes a receiver and demodulator 166 with an antenna 167 for receiving data from the signals from antenna 156 and displaying the appropriate information on screen 168.

The ship and land stations are also provided with monitor receivers 106, which receive and demodulate the signals in boxes 170 and display the information on screen 172, and which also provide audio outputs through speaker 174. Antenna 176 is mounted directly on the receiver 170.

The shipboard equipment also includes a telephone 108 with an antenna 178, which also received signals from antenna 156.

FIG. 6 schematically shows the elements. As shown in FIG. 6, the shore-based system 102 receives information from sensors via sensor links 179 and receiver 144. The information is received from distance and speed measuring units 114 and 116, and from separate ranging units 180 and 182, which may be ultrasound ranging units, radar ranging units or laser ranging units.

Bow and stern line tension sensing devices 140 and 142 supply information to receiver 144.

The current direction and speed sensor 128 and wind direction and speed sensor 130 supply the information to receiver 144.

Cargo flow meter 162 supplies its information. The ship cargo level sensor 184 is on the ship itself and may be connected by radio frequency link to the receiver 144.

Telephone line 158 is connected directly to the computer, and video camera 186, which shows the relative position of ship and dock, is connected directly to the computer.

Mooring line tension sensors 140 and 142 sense the tension of mooring lines 141 and 143 and communicate the tension indications to a receiver 144 via an antenna 146 or the wire cable or optical fiber lines. The data receiver 144 transmits the data to a signal conditioning unit 148, which adapts the signals for transmission to the computer 150. The computer 150 uses software to assemble the data and record the data, and transmits the data to converter 152, which converts the computer data to monitor signal norms. Converter 152 communicates the signals to the modulator transmitter 154, which broadcasts the signals from antenna 156.

A software package 188 controls the computer and records are recorded in recorder 190 for future reference and training. Recorder 190 may be a disc, a printer or a chart recorder. The information is transmitted by RF frequency information signals 192 to the hand-held display 104, the monitor 106, and the telephone 108.

While the invention has been described with reference to specific embodiments, modifications and variations of the invention may be constructed without departing from the scope of the invention, which is defined in the following claims.

I claim:

1. A marine information system comprising first and second spaced radar transceivers positioned along a dock for directing radar signals to a ship hull and receiving return signal from the ship hull, first and second spaced mooring tension sensors mounted on a dock for connecting to the ship by moorings and determining tension on the moorings, a water movement condition sensor contacting the water near the dock, a wind speed and direction sensor mounted on the dock for sensing wind direction and speed, a flowmeter mounted on the dock for sensing fluid flow between the ship and the dock, power sources connected to the transceivers and connected to the sensors and communication links connected to the transceivers and to the sensors for receiving information from the transceivers and sensors, and a complementary receiving communication link on the ship for receiving transceiver and sensor information.

2. The marine information system of claim 1, wherein the communication link comprises a data receiver for receiving information from the sensors and transceivers, and a signal conditioning unit connected to the data receiver for conditioning the signal, a computer connected to the signal conditioning unit for receiving conditioned signals and producing broadcast signals, a converter connected to the computer for converting the signals, and a transmitter connected to the converter for transmitting the signals, and wherein the shipboard receiving link receives signals from the transmitter.

3. The system of claim 1, wherein the transceivers comprise distance and speed measuring units and further comprising separate ranging units, and wherein the mooring tension sensors comprise bow and stern line tension sensing devices, wherein the water information unit comprises a current direction and speed sensor, and further comprising a ship cargo lever sensor, and wherein each sensor, transceiver and ranging unit has a signal transmitter, and wherein the first communications link has a signal receiver which receives signals from the sensors, ranging units and transceivers, and a signal conditioning unit connected to the receiver and a computer connected to the signal conditioning unit for receiving condition signals, a software package connected to the computer for controlling the computer, and a recorder connected to the computer for recording information from the computer, a signal converter connected to the computer for converting the signals to signals for radio transmission, and a transmitter connected to the converter, an antenna connected to the transmitter for broadcasting signals to hand held displays, monitors and telephones on the ship.

4. A marine information system for assistance in docking of vessels, comprising sensors and radar transceivers for providing information indicative of relationship between a ship and a reference, a computer receiving information from the sensors and radar transceivers for coordinating information, a wireless transmitter connected to the computer for transmitting signals from the computer indicative of the information, a portable receiver and indicator carried by a ship's officer and having a receiver for receiving transmitted signals from the wireless transmitter and displaying information.

5. The marine information system of claim 4, further comprising monitors and telephones connected to the computer and ship monitors and telephones connected to the shipboard wireless receiver.

6. The system of claim 5, further comprising sensor and transmitter systems being placed at spaced positions along a length of rivers and coast lines at river bends, bridges and narrow channels, confluences and traffic crossings for sensing local water and wind conditions and sensing local traffic at respective positions, determining positions and speeds of local traffic at specific positions sensed, and transmitting information about the position and speed and wind and water information.

7. The system of claim 6, further comprising multiple sensor and transceiver locations and transmitters and a central fixed station for receiving and processing information from the location modules and for transmitting to ships, scheduling information, speed and directions for coordinating and directing ships, tugs and barges along rivers and coast lines and in docking areas.

* * * * *